Figure 3:
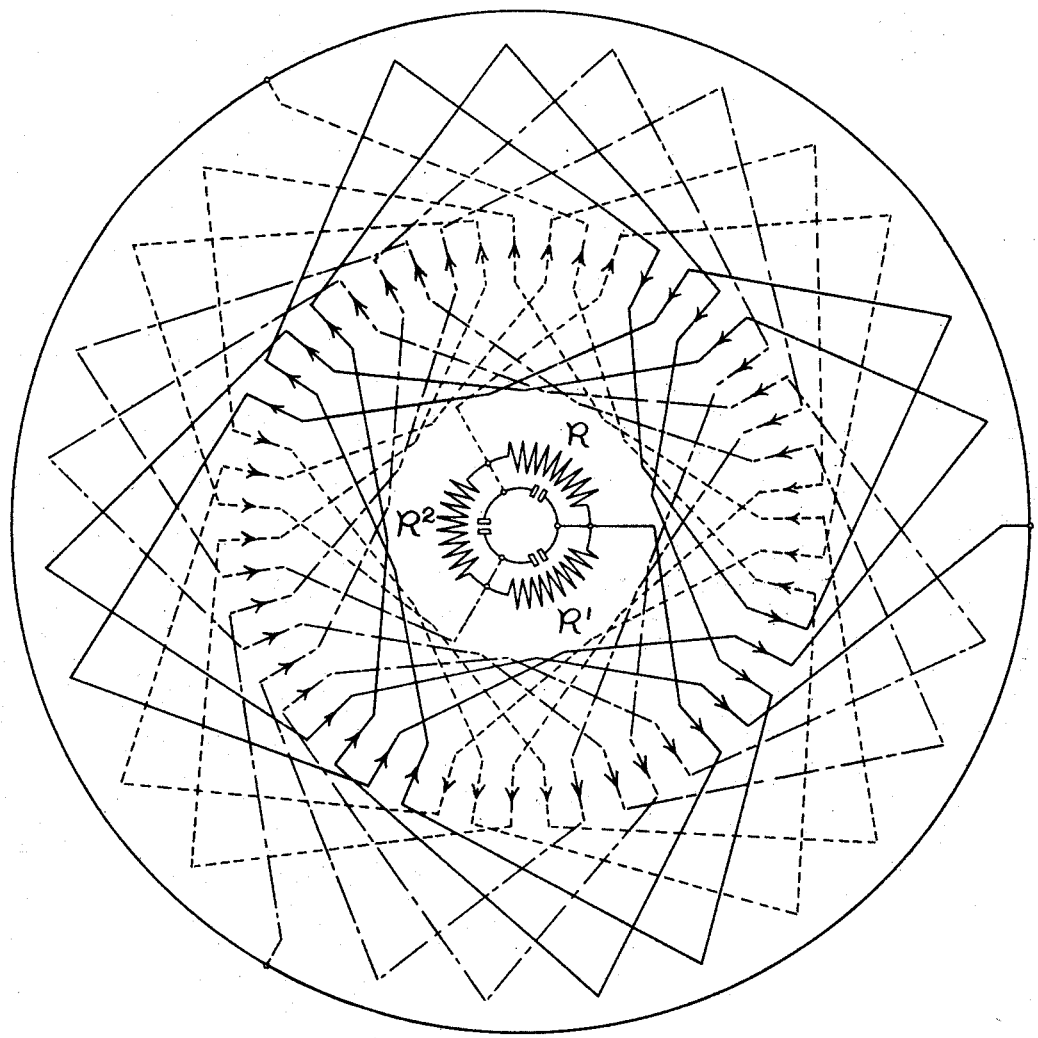

No. 620,966. Patented Mar. 14, 1899.
E. W. RICE, Jr. & C. P. STEINMETZ.
INDUCTION MOTOR.
(Application filed Oct. 16, 1897.)
(No Model.) 2 Sheets—Sheet 1.
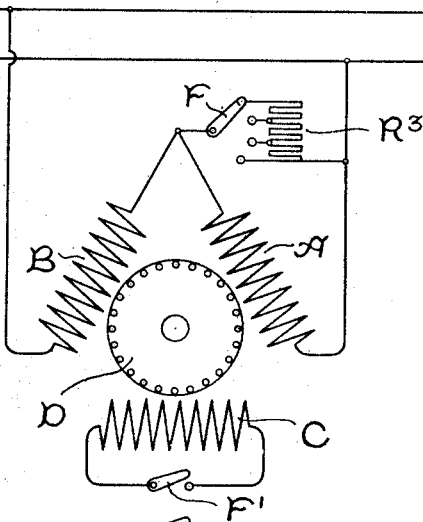
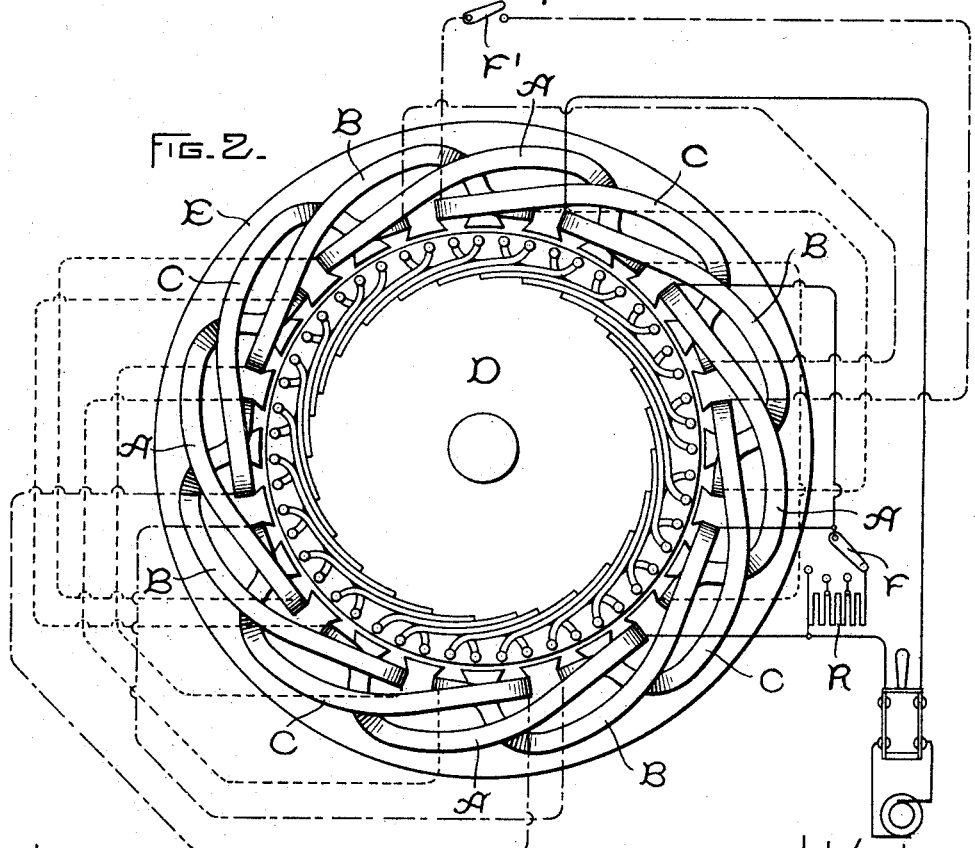

No. 620,966. Patented Mar. 14, 1899.
E. W. RICE, Jr. & C. P. STEINMETZ.
INDUCTION MOTOR.
(Application filed Oct. 16, 1897.)

(No Model.) 2 Sheets—Sheet 2.

WITNESSES
A. H. Abell.
A. H. Macdonald.

INVENTORS.
Edwin W. Rice, Jr. and
Charles P. Steinmetz by
Geo. B. Blodgett,
Atty.

UNITED STATES PATENT OFFICE.

EDWIN W. RICE, JR., AND CHARLES P. STEINMETZ, OF SCHENECTADY, NEW YORK, ASSIGNORS TO THE GENERAL ELECTRIC COMPANY, OF NEW YORK.

INDUCTION-MOTOR.

SPECIFICATION forming part of Letters Patent No. 620,966, dated March 14, 1899.

Original application filed July 29, 1893, Serial No. 481,907. Divided and this application filed October 16, 1897. Serial No. 655,458. (No model.)

*To all whom it may concern:*

Be it known that we, EDWIN W. RICE, Jr., and CHARLES P. STEINMETZ, citizens of the United States, residing at Schenectady, in the county of Schenectady and State of New York, have invented certain new and useful Improvements in Induction-Motors for Alternating-Current Circuits, of which the following is a specification, taken in connection with the drawings hereto annexed.

Our invention relates to induction-motors for alternating-current circuits, and has for its object to provide a motor which may be started in a simple and efficient way, being particularly adapted to motors operated on single-phase alternating-current systems.

In an application filed July 29, 1893, Serial No. 481,907, we have described two forms of motors, one of which is the subject of our present application, and have made certain claims broad enough to cover both forms. One form described in the said application contained two inducing windings only, displaced from each other by substantially one-third of the polar pitch, an arrangement which must necessarily leave a portion of the inducing member unwound, while the second form was wound in a manner similar to the ordinary three-phase motor. The present application, which is a division of the application above mentioned, is more particularly directed to the said second form.

Prior to the date of our invention it had been customary to construct the so-called "phase-splitting motors" with poles displaced from each other by substantially one-quarter of the polar pitch and to excite one set of the said poles from the single-phase mains and to excite the other set of poles by dephased currents derived directly or indirectly from the said mains. This is objectionable, for the reason that it is difficult to secure a phase displacement of ninety degrees between the two currents, and for that reason the rotary field produced by such motor is unsymmetrical in character.

One feature of the improvements described in our former application and in this present application consists in the use of poles displaced from each other by approximately one-third of the polar pitch, which requires a phase displacement between the currents, which may be more readily obtained in practice.

In the form shown in the present application there are one main inducing-coil and a plurality of auxiliary inducing-coils, preferably two.

Other features of the invention will be hereinafter more particularly described and will be pointed out in the annexed claims.

In the drawings attached to this specification, Figure 1 is a diagrammatic view of our improved motor. Fig. 2 is a general view of our improved motor in its preferred form, and Fig. 3 is a view of the preferred form of armature.

In Fig. 1, B is the main inducing-coil, while A and C are auxiliary inducing-coils. It will be seen that the coils A and B are connected in series across the circuit, while the coil A is shunted by the variable resistance $R^3$, controlled by the switch F. The coil C is closed on itself through the switch F'.

The action of this motor is as follows: In starting the switch F' is open and the switch F is so placed as to short-circuit the coil A, preferably including a portion of the resistance $R^3$. The action is somewhat complex, but we understand it to be about as follows: The coil A is excited direct from the single-phase mains and also has induced in it current by the lines of force generated by the coil B and by the lines of force generated by the current set up in the armature D by the action of the coil B. The result is to generate in A a resultant current dephased from the current in B by an angle depending on the amount of resistance in $R^3$. It will be seen that $R^3$ is a phase-shifting device shunting the coil A, so that the current passing through B is split into two components, of which the leading component passes through $R^3$ and the lagging component through A. If now the switch F' be closed, a current will flow in the coil C, which current will be out of phase with the current in each of the coils A and B. When a speed approaching that of synchronism is attained, the switch F may be opened, when the coils A and B will be connected in series across the lines and will generate a resultant flux passing through the armature and through the coil C. This resultant flux will generate in the coil C a current which will tend to reduce the apparent self-induction of the armature and to keep its current and electromotive force in phase. It is also possible by suitable connections to substitute each for each of the coils A C and their functions, and in this way the direction of revolution of the rotating member is readily reversed—that is, at the start the coil C can be closed and the coil A left open-circuited for a time, as will be readily understood.

Referring now to Fig. 2, the mode of operation will be obvious from the description already given. A, B, and C are the three inducing-coils wound in slots in the face of the ring E in such a way as to produce a multipolar motor. We ordinarily prefer to use the multipolar arrangement, as it is more efficacious than the other forms of alternating-current motors, and we particularly prefer to use a magnetic structure with projecting teeth or having recesses for the coils, as shown in the drawings.

Fig. 3 shows the preferred form of the induced member or armature composed of a multiphase winding with the resistances R R' R$^2$ capable of being cut out in the usual way. We find that the use of such an armature greatly assists the action of the motor.

We claim as our invention and desire to secure by Letters Patent—

1. The combination with single-phase mains, of an alternating-current motor containing three angularly-displaced windings, one of which receives current by inductive action from the other two, and all of which receive energy derived from the single-phase mains, and means for shunting one winding by a device adapted to shift the phase of current in said winding.

2. The combination with single-phase mains, of an alternating-current motor containing three angularly-displaced windings, one of which receives current by inductive action from the other two, and all of which receive energy derived from the single-phase mains, and means for shunting one winding by a device adapted to retard the phase of current in said winding.

3. The combination with single-phase mains, of an alternating-current motor having a plurality of angularly-displaced windings, one of which receives its energy by induction through the induced member of the motor, and all of which receive their energy either directly or indirectly from the single-phase mains, and means for shunting one winding by a device adapted to shift the phase of current in one of said windings.

4. The combination with single-phase mains, of an alternating-current motor having a plurality of angularly-displaced windings, one of which receives its energy by induction through the induced member of the motor, and all of which derive their energy either directly or indirectly from the single-phase mains, and means for shunting one winding by a device adapted to retard the phase of current in one of said windings.

5. The combination of a pair of single-phase mains, of an alternating-current motor having three angularly-displaced windings, all of which receive their energy either directly or indirectly from the single-phase mains, means for closing one winding on itself, and means for shunting another winding by a device adapted to shift the phase of the current therein.

6. The combination of a pair of single-phase mains, of an alternating-current motor having three angularly-displaced windings, all of which receive their energy either directly or indirectly from the single-phase mains, means for closing one winding on itself, and means for shunting another winding by a device adapted to retard the phase of the current therein.

7. The combination in an alternating-current motor, of an inducing and an induced member, three angularly-displaced windings on the inducing member, two of which receive energy directly through two supply-mains, means for dephasing the current in the said two windings, and means for short-circuiting the third winding.

8. The combination in an alternating-current motor, of an inducing and an induced member, and a short-circuited winding arranged on the inducing member and within the inductive influence of current in the induced member and acting to reduce the self-induction of the induced member.

9. The combination in an alternating-current motor of an inducing winding having angularly-displaced coils, a short-circuited winding arranged on the inducing member, in the axis of polarization of the inducing winding, and an induced member within the influence of currents in said windings of the motor.

In witness whereof we have hereunto set our hands this 13th day of October, 1897.

EDWIN W. RICE, JR.
CHARLES P. STEINMETZ.

Witnesses:
B. B. HULL,
M. H. EMERSON.